United States Patent [19]

Larocque

[11] Patent Number: 5,362,950
[45] Date of Patent: Nov. 8, 1994

[54] GRID FOR SELECTING DATA AND KIT INCORPORATING THE SAME FOR ENTERING SAID DATA INTO A COMPUTER

[76] Inventor: Francois Larocque, 3115, fue Francois ler, R.R. 1, Drummondville, Québec, Canada, J2B 6V2

[21] Appl. No.: 61,476

[22] Filed: May 17, 1993

[51] Int. Cl.⁵ .................... G06K 7/04; G06K 19/06; G09B 3/00
[52] U.S. Cl. .................... 235/448; 235/490; 434/327
[58] Field of Search .............. 235/490, 487; 434/407, 434/326, 346, 353, 200, 202, 333, 334, 347, 354, 357, 360, 322, 327, 201

[56] References Cited

U.S. PATENT DOCUMENTS

| | | | |
|---|---|---|---|
| 2,357,744 | 9/1944 | Kennerly | 434/353 |
| 3,093,915 | 6/1963 | Simone | 434/353 |
| 4,752,073 | 6/1988 | Thompson | 434/353 |

FOREIGN PATENT DOCUMENTS

| | | | |
|---|---|---|---|
| 908983 | 9/1972 | Canada . | |
| 1956758 | 5/1971 | Germany | 434/334 |
| 2361249 | 8/1974 | Germany | 434/334 |

*Primary Examiner*—Donald Hajec
*Assistant Examiner*—Jeffrey R. Filpek
*Attorney, Agent, or Firm*—Edwin E. Greigg; Ronald E. Greigg

[57] ABSTRACT

A grid for use to select and enter data into a computer, which comprises a planar surface on which selective elements, preferably consisting of beads, are movably mounted. Each element can be introduced onto the planar surface between a set of predetermined locations that preferably extend along a slot and each corresponds to one of the data to be entered. Each slot corresponds to a question. For each question, the grid offers several positions which correspond to a corresponding number of responses. Once all the responses are given, the grid can be read by a suitable reader connected to a microcomputer, the process being simple, fast, reliable and not expensive. The grid and its reader can be part of a kit also including a software to be inserted and used by the computer to which the reader is connected, for compiling the information that is transmitted to this computer by the reader. The kit may also include one codification sheet per marking grid, containing visual marks positioned to correspond to the different locations where the beads can be positioned.

10 Claims, 6 Drawing Sheets

GRID FOR SELECTING DATA AND KIT INCORPORATING THE SAME FOR ENTERING SAID DATA INTO A COMPUTER

BACKGROUND OF THE INVENTION a) Field of the Invention

The present invention is concerned with a new device for selecting data, which device is in the form of a grid which, once it is slid into a suitable reader, permits one to rapidly enter the select data into a computer.

The invention is also concerned with a kit comprising one or more grids of the above-mentioned type together with a suitable reader for the fast entry of the data selected onto each of the grids into a computer.

BRIEF DESCRIPTION OF THE PRIOR ART

In the field of computers, the entry of data has always been a problem which substantially reduce the efficiency of the process, whatever it is. By way of example, the entry of data coming from a gallup pole or sample survey represent a substantial part of the cost of the whole process.

In the field of education, computers are more and more used as a tool for preparing and correcting objective tests. Once again, entry of the information into the computer constitutes a substantial task.

To tentatively overcome this problem, it has of course been suggested to computerize the entry of data. However, the systems that have been proposed so far for the computerization of the entry require the substantial amount of equipments. Indeed, each respondent needs a computer terminal. Alternatively, one can use an optical reader to enter data selected onto a shear. However, the centralization of such an approach and its lack of reliability makes it in efficient in most cases.

As a matter of fact, entry of data into a computer would benefit from a simple, reliable and fast process of selecting data and entering the same. These particular features, namely simplicity, reliability and fastness, are the main characteristic of the grid and kit according to the invention.

SUMMARY OF THE INVENTION

The object of the present invention is to provide a new device for selecting data in view of entering the same into a computer, which device consists of a rigid grid comprising at least one planar surface on which structural elements preferably consisting of beads, are movably mounted. Each element is movable onto the planar surface between a set of predetermined locations that are specific to it and each corresponds to one of the data to be selected.

Preferably, this rigid grid is made of synthetic resin and weights a few grams only. Parallel slots can be provided therein, in which the beads may be slid up to a location which corresponds to one answer selected by the respondent to a questionnaire. Each slot of the grid corresponds to one question. For each question, the bead may occupy several positions, e.g. four, which correspond to a corresponding number of possible answers. In other words, each bead can be slid from its original position to one of its selected position corresponding to a selected answer.

At each location corresponding to one answer, the slot preferably comprises a widened portion in which a visual mark can advantageously be seen, this visual mark consisting of a number or a letter printed onto a sheet hereinafter called "codification sheet" which is insertable inside the grid.

Once all the answers have been given, the grid can be read by a suitable reader connected to a computer. The process is thus very simple, fast, reliable and not very expensive as compared to the optical reader process that is presently known.

Another object of the invention is a kit comprising one or more of the above mentioned grid together with the reader in which this grid can be slid in view of being read. The reader used in this kit basically comprises:

sensing means mounted so as to detect the presence of elements on the grid and determine the respective positions of the elements with respect to their corresponding sets of predetermined locations when the grid is slid into the reader;

a processing unit to determine the relative order of the elements whose presence and position have been detected, with respect to the other elements and as a function of the direction in which the grid is slid into the reader; and an interface for connecting the processing unit to a computer or microcomputer for compilation purpose.

The kit also comprises at least one software to be inserted and used by the computer to which the reader is connected, for compiling the information that is transmitted to the computer by the reader.

Advantageously, the kit may also comprise at least one codification sheet for each grid. The codification sheet is used as a gauge for facilitating the use of the corresponding grid. It comprises for this purpose, visual marks that are positioned so that each of these marks correspond to one of the locations of the sets of predetermined locations where the elements of the grid can be positioned.

DESCRIPTION OF THE DRAWINGS

The invention, its operation and its numerous advantages will be better understood upon reading of the following, non-restrictive description of a preferred embodiment thereof, made with reference to the accompanying drawings in which.

DETAILED DESCRIPTION OF THE PREFERRED EMBODIMENT OF THE INVENTION

The grid 1 according to the invention as shown in the accompanying drawings is in the form of a thin parallelepiped or rectangle comprising two opposite planar surfaces 3 and 5. These planar surfaces 3, 5 are made of two pieces of moulded plastic material that are identical in shape and structure and are connected to each other in superimposed position along one of their respective longitudinal edges. Fixation of these two pieces is achieved by snugly fitting small projection 7 moulded along the corresponding edges of the pieces into recesses 9 provided along the same edges.

Figure 1:
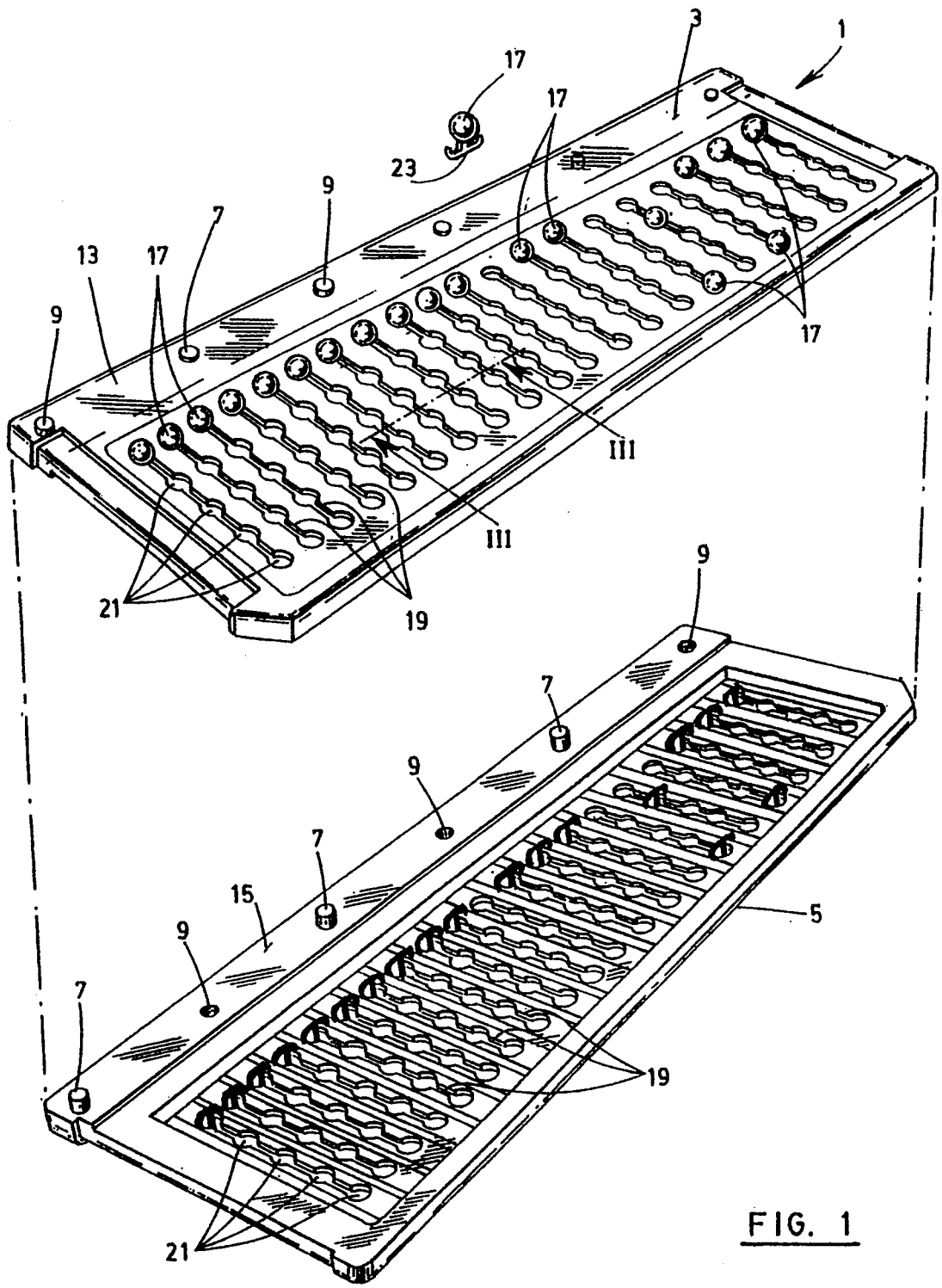
FIG. 1 is an exploded perspective view of a grid according to the invention, showing one of its beads out of its corresponding slot.
Figure 3:
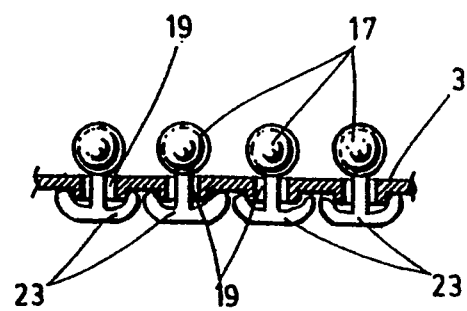
FIG. 3 is a partial cross-sectional view of one of the surface of the grid taken along line III—111 of FIG. 1, showing the way the beads are mounted and held in position.
Figure 2:
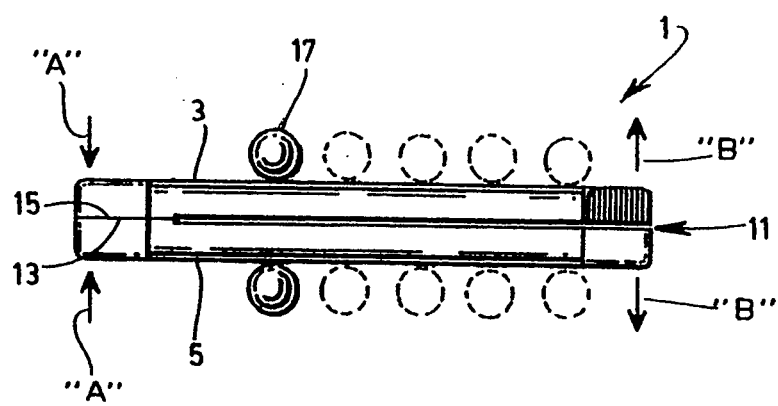
FIG. 2 is an end elevational view of the grid shown in FIG. 1, showing in dotted lines the different transversal positions as can be reached by the movable beads.

Once they are fixed to each other, the pieces 3 and 5 together form a unitary structure provided with a thin central slot 11, as shown in FIG. 2. This slot 11 defines a thin space that opens opposite to the connected edges of the pieces 3 and 5. Advantageously, the contact surfaces 13, 15 of the edges of the pieces connected to each other can be slightly bulging or otherwise shaped so that, by pinching the grid next to these contact surfaces (see arrows A in FIG. 2), one may slightly open the slot 11 on the other side (see arrows B on FIG. 2).

Structural elements 17 are movably mounted onto each of the planar surfaces 3 and 5. These elements 17 preferably consist of beads. It should however be understood that these elements may be of any other shape, the only requirement for such elements being that (1) one may move them easily with his or her fingers and (2) each element provides a sign that is visible by the user and is readable by the reader, as will be better explained hereinafter.

As previously indicated, the elements 17 are movably mounted on each surface so that each of them may move between a set of predetermined locations that are specific to it and each corresponds to one of the data to be entered.

As is shown, the predetermined locations of each set are aligned on each planar surface and the sets to the different elements are positioned adjacent and parallel to each other. For this purpose, rectilinear slots 19 are provided onto each planar surface, each incorporating and corresponding to one of the sets of predetermined locations corresponding to an element 17. These slots are preferably transversal and thus perpendicular to the edges of the two pieces, that are connected to each other. The number of predetermined locations per slot is preferably equal to 5, even though more or less locations could be used depending on the user's need.

When, as is shown, the elements 17 are beads, each slot 19 comprises a small widened portion 21 at each of the predetermined locations in order to facilitate the positioning and holding of the corresponding bead at any one of these locations. The beads are themselves held into the slot with attachment means preferably consisting of prestressed hooks 23 of given resiliency. Advantageously, the beads 17 and their hooks 23 can be moulded in one single piece of plastic material.

Figure 4:
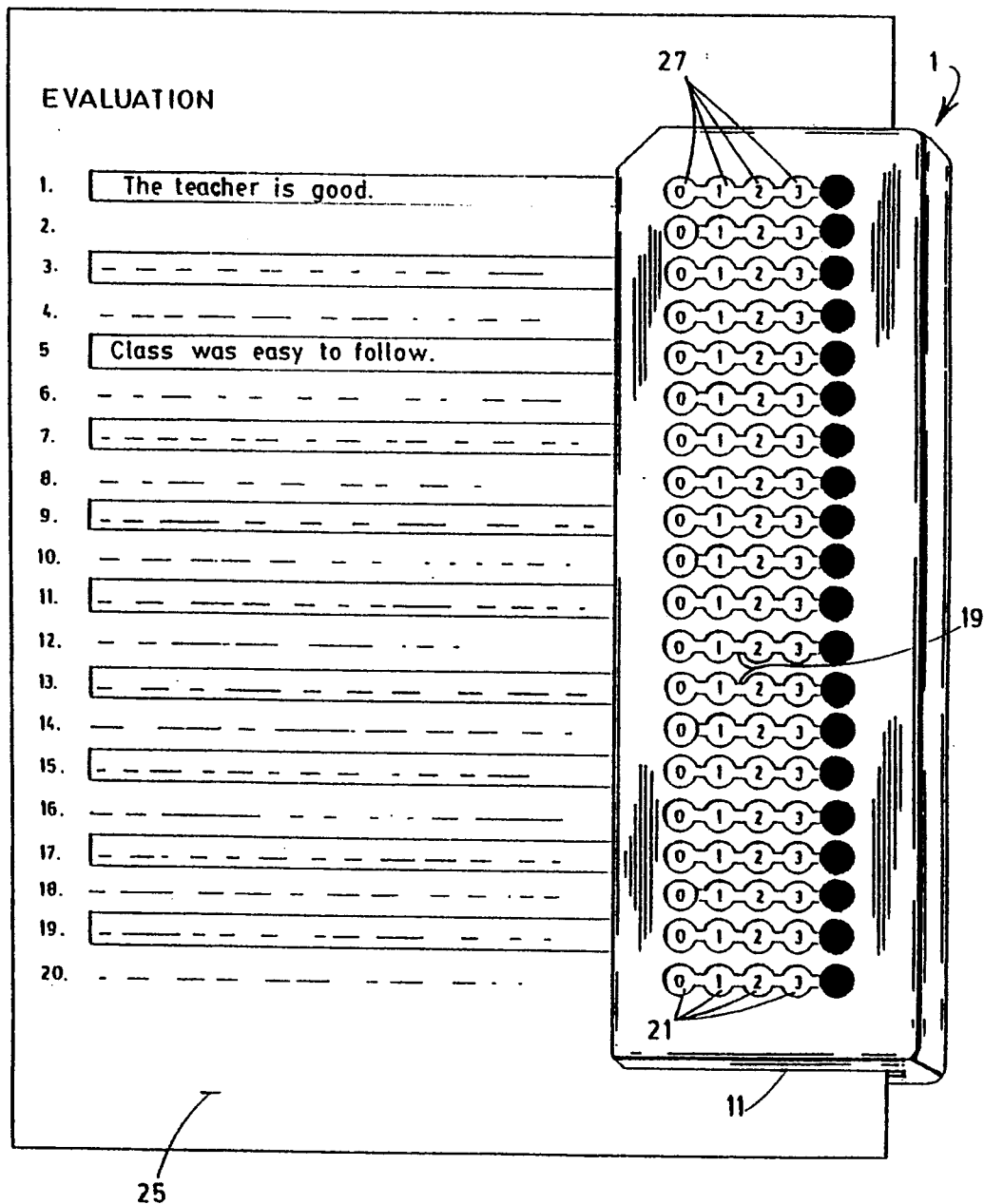
FIG. 4 is a front perspective view of the grid previously illustrated, when it is used with a codification sheet including a questionnaire, for carrying out an evaluation.
Figure 5:
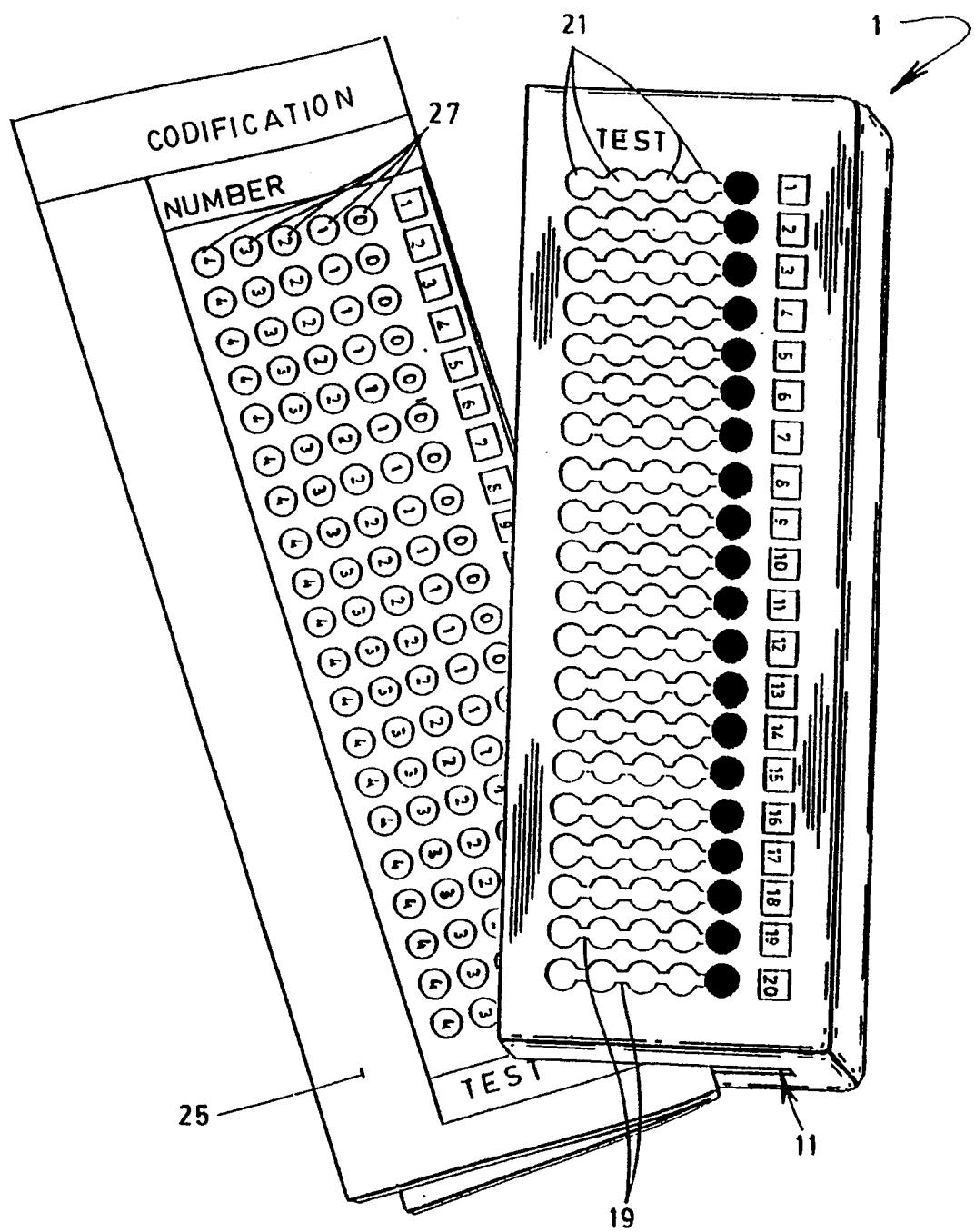
FIG. 5 is a view similar to that of FIG. 4, showing the same grid used with a codification sheet without questionnaire, for carrying out a test.

As is shown in FIGS. 4 and 5, the thin space defined by the slot 11 between the pieces 3 and 5 of the grid permits to insert a codification sheet 25 used as a gauge, which comprises visual marks 27 positioned in such a manner that each of the marks correspond to one of the selected locations where one of the data is to be entered. As is shown in FIG. 4, this codification sheet 25 may include a questionnaire printed in such a manner as to correspond to the visual mark 27.

Figure 6:
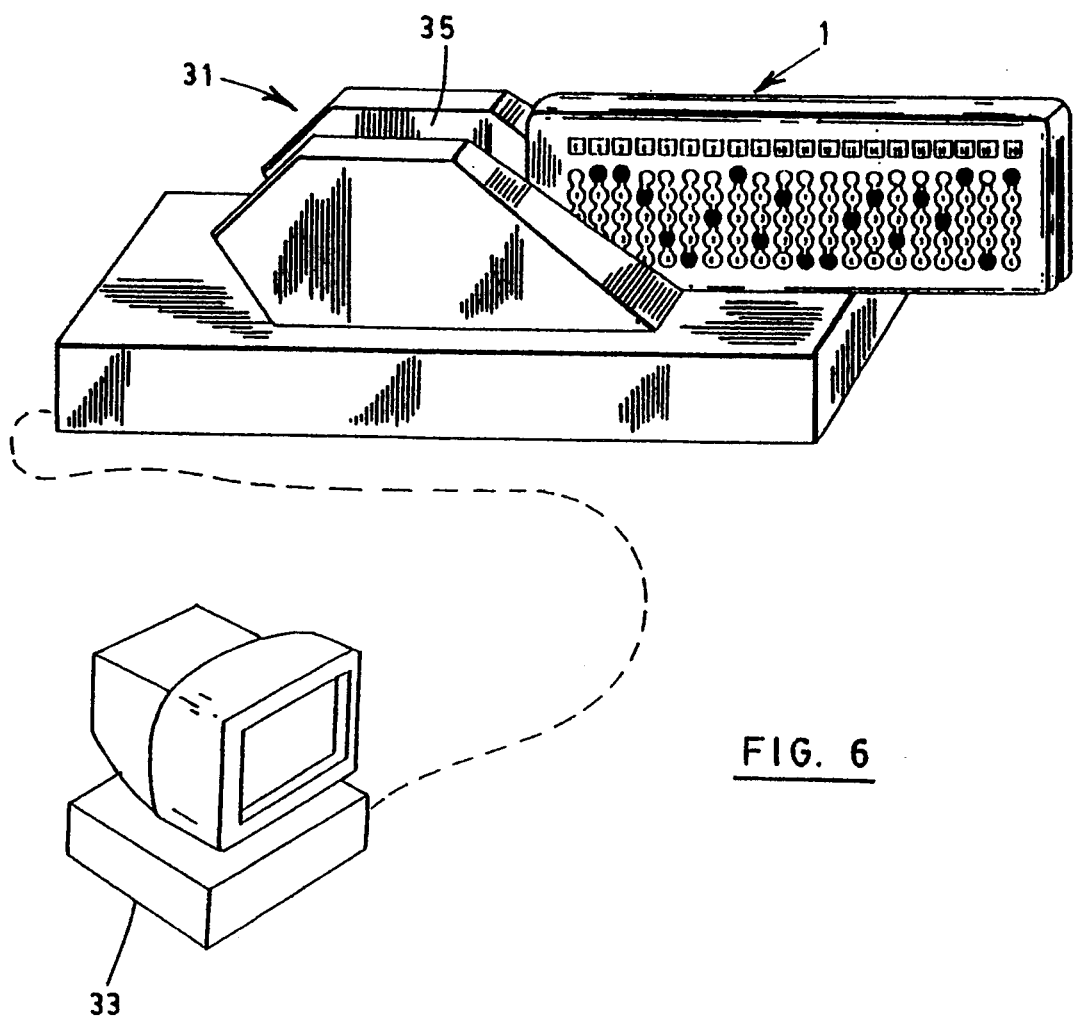
FIG. 6 is a schematic perspective view of a reader in which each grid can be slid in view of transmitting the respective position of the different beads to a computer, for compilation purpose.
Figure 7:
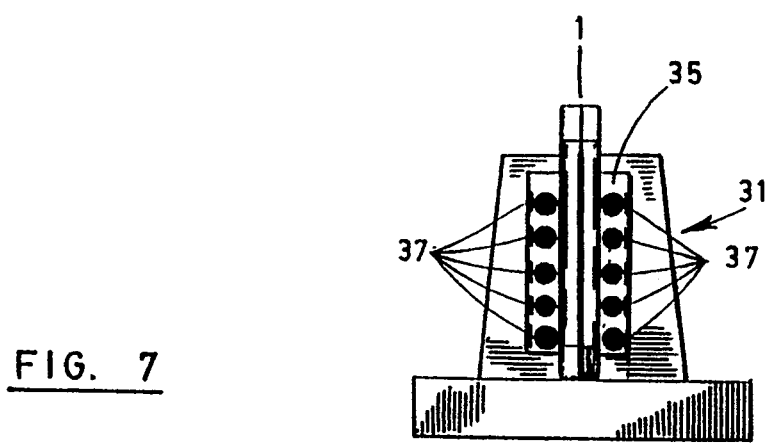
FIG. 7 is an end view of the reader shown in FIG. 6, showing the position of its sensors with respect to the beads of a grid when the same is passed with the reader.
Figure 8:
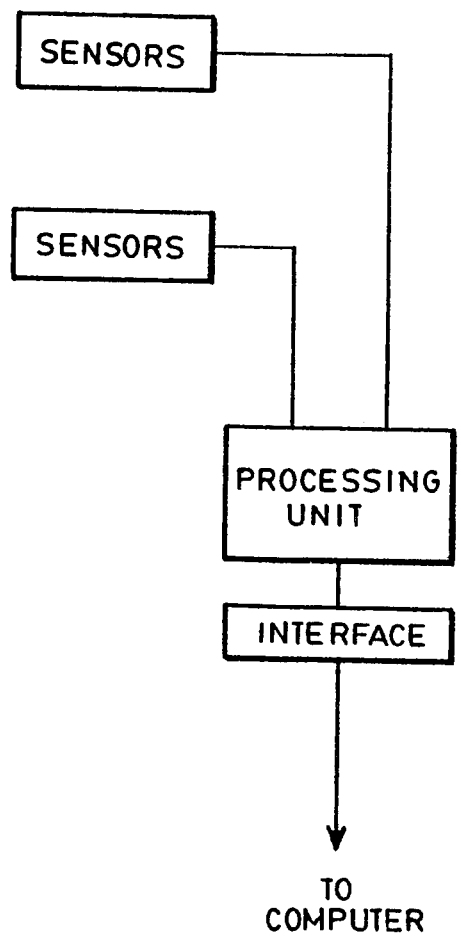
FIG. 8 is a block diagram of the electronic circuitry of the reader shown in FIGS. 6 and 7.

The grid 1 previously disclosed is intended to be read by a reader 31 as shown in FIGS. 6 and 7.

This reader 31 which is intended to be connected to a computer or a microcomputer 33, comprises a slot in which the grid 1 can be slid so as to be read.

Sensing means 37 are positioned on both sides of the slot 35 in order to detect the presence of the elements 17 of the grid and thus determine their relative positions with respect to their respective sets of predetermined locations when the grid is slid into the reader.

The reader 31 also comprises a processing unit 39 to determine the relative order of the elements whose presence and position have been detected, with respect to the other marking elements and as a function of the direction in which the grid is slid into the reader.

The reader 31 further comprises an interface 41 connectable to the inlet port of the computer 33 for transmitting the information that was determined by the processing unit to the computer 33, in which this information is compiled thanks to a software specifically devised for this purpose.

The grid 1 disclosed hereinabove was tested for entering answers submitted by five groups of students at college, during their exams. For each group, the following steps were followed.

(a) The teacher went to school with an attache-case containing copies of the exam, codification sheets, grids and a portable microcomputer to which the reader of the grid could be easily connected. Each student received a copy of the exam and a codification sheet 25 on which his or her responses were first marked by colouring small circles corresponding to selected answers. As soon as the codification sheet was completed, the teacher gave him or her a grid. The student then inserted his or her codification sheet duly completed within the grid and moved the beads so as to cover the selected answers.

(b) The teacher, in the meantime, had connected the reader to the microcomputer and had "inserted" the right answers into the computer by passing through the reader a grid containing the right answers.

(c) The grid of each student was then slid into the reader. Instantaneously, the right and wrong answers were displayed onto the screen, the wrong answers flashing to make them more apparent. The student's mark for his exam and his or her percentage were also displayed, thanks to the software provided for this purpose in the microcomputer.

(d) At the end of the reading, the computer displayed the results of the total compilation, including numerous statistics. Thus, in the case of formative evaluations, the kit according to the invention has permitted to rapidly identify the weakness of a group of students and, consequently, to evaluate the corrections that should be made.

Therefore, the advantages of the grid according to the invention are:

(a) to permit a fast entry of a group of answers with a minimum intervention from the teacher or user (sliding of the grids into the reader can be made directly by the teacher or by the respondent); and (b) to permit the instantaneous display of the results of the test and, then, by way of example, immediately identifying the weakness of a student, thereby making it possible to rapidly act accordingly.

Once the data are read, the kit according to the invention also permits:

(c) to establish statistics for a group, thereby permitting the identification of the weakness of this group and to immediately start correcting the same; and (d) automatically transferring the results of the tests to the files of each respondent and without any intervention from the teacher.

Accordingly, the grid according to the invention when used in a suitable context, is a practical, efficient and low cost solution for entering data. The efficiency of this grid has already been demonstrated during the tests carried out by the Applicant, as reported hereinabove.

The software necessary for compiling the information entered with the grid can be of any type. However, for qualitative evaluation use can preferably be made of software using an estimation scale of the LIKERT type with four positions. For a quantitative evaluation, use can be made of a multiple choice, objective examination software. The conception of these softwares is well known and needs not be further detailed.

As previously indicated, the answers to the questionnaire are read by the reader and the compilation results are immediately displayed onto the computer's screen or printed. The software can be devised to provide statistics as to frequencies in numbers and percentages, and the average result on a 0 to 3 scale. This average result can also be displayed as a percentage and an histogram can be added to facilitate the interpretation of this result.

Following the entry of the answers with the reader, the marks can be automatically transferred to the files of the respondents with a ponderation index.

Statistics for a group can also be made, comprising frequencies in number and percentage of each of the four choices, the right answers being identified. One may also spot the respondents who elected the very same particular answer.

Management of the marks also permit the manual entry of laboratory or non-objective examination results.

As explained hereinabove, during an evaluation made with a questionnaire or an examination with a multiple choice of answers, the respondent has only to move the beads onto the grid so as to have them correspond to his or her answers. Then, one has only to slide the grid into the reader for instantaneously entering the data into the computer and have the result of the test displayed onto the screen. As soon as the last grid is read, statistics can be made and displayed.

This makes the kit according to the invention very interesting in colloques, congresses, pedagogic days or formation sessions in order to rapidly know the degree of satisfaction of the participants. This can also be useful in a school room to obtain a formative evaluation. Lightness of the grids and of the microcomputer of the laptop/notebook type with which the kit may be used, makes the whole system easy to carry to a class room or to any other location where an evaluation is to be made.

As previously indicated, the codification sheet 25 can include a questionnaire or can be separated and folded by the respondent before being inserted into the grid. The sheet 25 may also be permanently glued into the grid. In the case of an evaluation, the grid can be used specifically for entering the answers to a qualitative evaluation questionnaire with a satisfaction scale ranging from 1 to 5, which are identified from 0 to 3, the fifth position being used by those not capable of answering. In the case of a test, the grid can be used for entering answers to an objective exam with a multiple choice, including four choices of answers and a fifth neutral position.

I claim:

1. A kit for selecting and entering data, comprising:
   at least one grid comprising at least one planar surface on which structural elements are movably mounted, each element being movable onto said at least one planar surface between a set of predetermined locations that are specific to said element and each corresponds to one of said data to be selected;
   a reader in which each grid can be introduced and read, said reader comprising:
   sensing means mounted so as to detect a presence of said elements on said grid and determine the respective positions of said elements with respect to their corresponding sets of predetermined locations when the grid is introduced into the reader;
   a processing unit that determines the relative order of the elements whose presence and position have been detected, with respect to the other elements and as a function of the direction in which the grid is introduced into the reader; and
   an interface for connecting a processing unit to a computer for compilation purpose; and
   at least one software to be inserted and used by the computer to which the reader is connected, for compiling the information that is transmitted to said computer by said reader.

2. The kit of claim 1, wherein the predetermined locations of each set are aligned onto said at least one surface of each grid and wherein all the sets of predetermined locations corresponding to all the elements of said grid extend adjacent and parallel to each other.

3. The kit of claim 2, wherein said marking elements consist of beads.

4. The kit of claim 3, wherein said beads are provided with attachment means to hold them into rectilinear slots provided into said at least one planar surface, each of said slots including and corresponding to one of said sets of predetermined locations corresponding to a given bead, each bead being movable along the slot in which it is held in such a manner as to be positionable in any of said predetermined locations of said set corresponding to said slot.

5. The kit of claim 4, wherein each slot comprises a widened portion at each of said predetermined locations so as to facilitate positioning and holding of the bead at said locations.

6. The kit of claim 5, wherein the attachment means of said beads comprise small prestressed hooks of given resiliency.

7. The kit of claim 6, wherein each grid comprises two of said planar surfaces opposite to each other and each planar surface is provided with slots and beads movable along said slots, said two opposite planar surfaces defining therebetween a thin space in which a codification sheet is insertable, said codification sheet containing visual marks positioned in such a manner that each of the marks corresponds to one of said widened portions of said slots and are visible therein, and thus to one of said predetermined locations where one of the data is to be selected.

8. The kit of claim 7, wherein each grid has the general shape of a thin rectangle, said two planar surfaces opposed to each other being identical in shape and structure and both made of a same simple piece of molded plastic material, said pieces being connected to each other in superimposed position along one longitudinal edge thereof exclusively, the slots in said planar surface of each of said pieces being transversal and thus perpendicular to said connected edges.

9. The kit of claim 1, further comprising:

at least one codification sheet for each grid, said codification sheet being used as a gauge for facilitating the use of the corresponding grid, said codification sheet comprising, for this purpose, visual marks that are positioned so that each of said marks correspond to one of said locations of said sets of predetermined locations where the elements of the grid can be positioned.

10. The kit of claim 9, wherein said codification sheet includes a questionnaire.

* * * * *